M. MARTIN.
FLUID GAGE.
APPLICATION FILED JAN. 30, 1907.
903,212.
Patented Nov. 10, 1908.
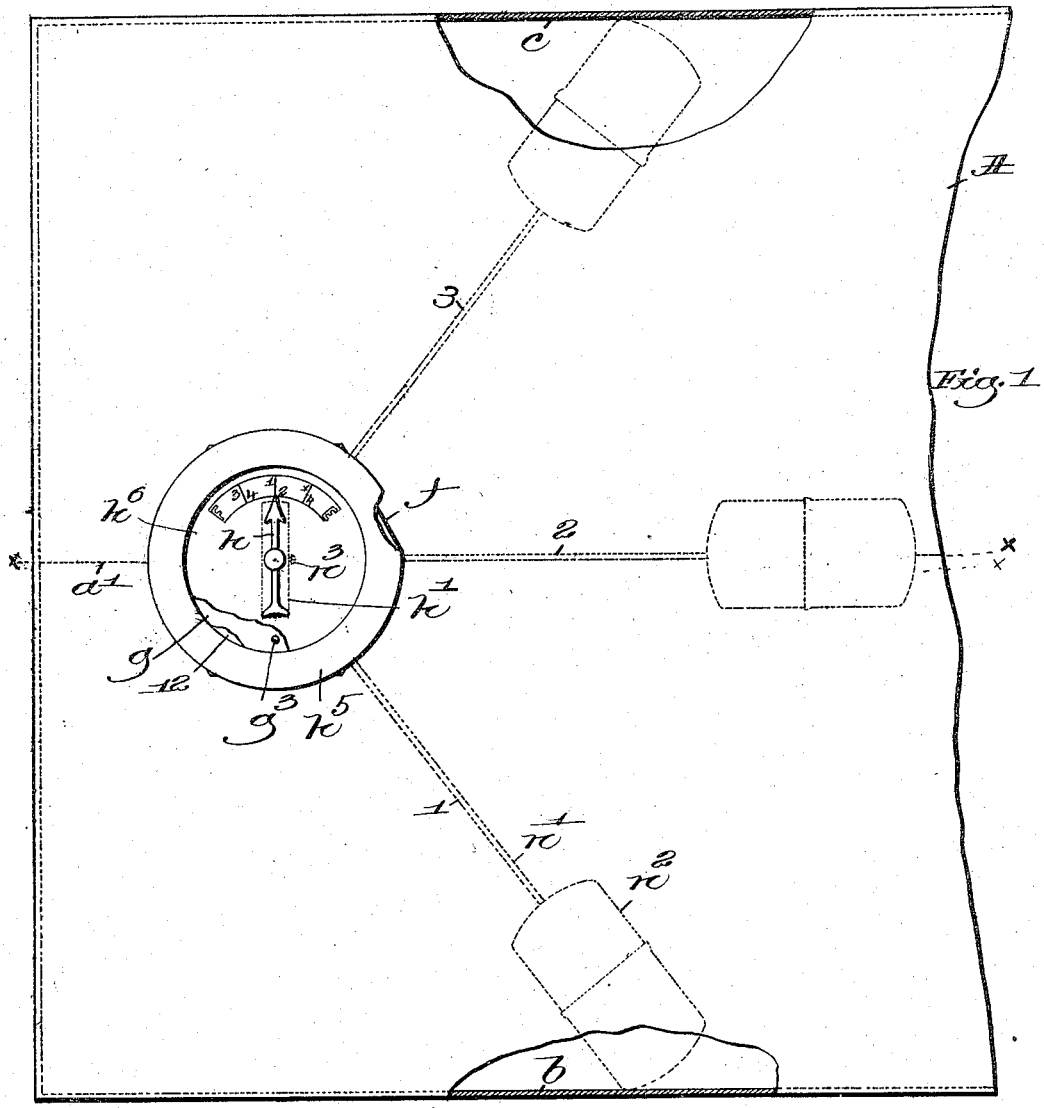
Fig. 1.
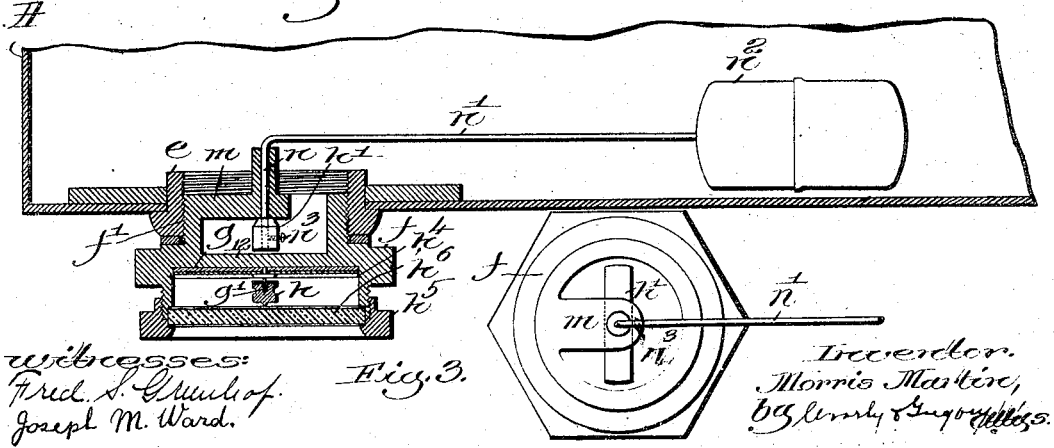
Fig. 2.
Fig. 3.

UNITED STATES PATENT OFFICE.

MORRIS MARTIN, OF MALDEN, MASSACHUSETTS.

FLUID-GAGE.

No. 903,212.  Specification of Letters Patent.  Patented Nov. 10, 1908.

Application filed January 30, 1907. Serial No. 354,857.

*To all whom it may concern:*

Be it known that I, MORRIS MARTIN, a citizen of the United States, residing in Malden, county of Middlesex, and State of Massachusetts, have invented an Improvement in Fluid-Gages, of which the following description, in connection with the accompanying drawing, is a specification, like letters on the drawing representing like parts.

This invention has for its object the production of a novel fluid gage adapted for use with tanks of automobiles, motor-boats and the like.

The gage shown comprises a head, a magnetic pointer at the outer side of the head, a bearing at the inner side of the head sustaining a rock-shaft provided with a permanent magnet, the rock shaft having connected with or extended from it a float-carrying arm, the magnetic pointer in practice being moved by the magnet over a dial exposed at the outer side of the head.

Figure 1 in face view shows my novel gage in one practical form, the gage being supposed to be applied to the side of a tank, the figure showing the arm carrying the float in its extreme and middle positions; Fig. 2 is a sectional view looking downwardly, Fig. 1, showing the head and part of the float-carrying arm, the section being in the line $x$—$x$, Fig. 1; Fig. 3 is a rear side elevation of the head showing the bearing for the rock-shaft and the permanent magnet, together with part of the float-carrying arm.

In the drawings, A represents a tank containing fluid represented by the dotted line $a'$, the bottom of the tank being represented by $b$ and the top by $c$. If the tank is seven inches deep, a hole will be cut in the side wall thereof midway its top and bottom, and preferably in this hole I solder, clamp or rivet in any usual way a bushing $e$ herein shown as threaded internally. This bushing receives the head $f$ of the gage, it having an imperforate plate 12. The rear part of the head, see Fig. 2 is shown as having external screw threads $f'$. The front side of the head has a chamber for the reception of a magnetic pointer $h$ that is mounted on a pin $g'$ suitably sustained in said chamber in which is laid a dial, comprising, as shown in Figs. 1 and 2, a circular plate $g$ and an overlying member of aluminum or celluloid marked to form a scale showing the letter E, indicating empty, and F indicating full, and fractional lines between which may show $\frac{1}{4}$, $\frac{1}{2}$, and $\frac{3}{4}$, meaning one-quarter, one-half, and three-quarters full.

The dial $g$ shown has an outwardly extended pin $g^2$ having its end extended through the celluloid or aluminum member overlying said dial $g$ that may be engaged, when the glass is removed, that the dial may be turned in the head, as will be described, should it be deemed desirable to do so, as is sometimes the case. The dial is shown as maintained frictionally in contact with the outer side of the plate 12 of the head by a ring $h^4$ entering a groove in said chamber, the chamber also having, as shown, a shoulder to sustain a glass $h^6$ that may be held in place by means of a clamping ring $h^5$, shown as screwed on to the threaded outer end of the head, but it will be understood that this glass may be held in position in any other usual or suitable manner.

The inner side of the head has an inwardly extended arm $m$ constituting a bearing fixed to or forming part of the head, said bearing having a hole to receive a rock-shaft $n$, the latter sustaining at its inner end a permanent magnet $h'$, said rock-shaft having also a laterally extended arm $n'$ on the end of which is mounted a float $n^2$ preferably of sheet metal and hollow.

The drawing, Fig. 1, shows the float in three different positions, position 1 representing the float when the tank is empty, position 2 when half full, and position 3 when practically full. The permanent magnet $h'$ is adjustably attached to the rock-shaft $n$ by a set screw $n^3$. The drawing shows the scale as occupying a position in the upper portion of the chamber at the outer side of the head, and with the dial in such position it will be understood that the north pole of the magnet $h'$ is arranged to occupy a position above the pin $g'$ on which the magnetic pointer is mounted, said north pole holding by its magnetism the south pole or arrow shaped head of the magnetic pointer. Some users of a gage of this sort desire to read the scale below the pivot pin $g'$, and in such event the magnet $h'$ will be turned say half way around on the rock-shaft $n$ and the pin $g^3$ of the dial will be engaged by hand after removing the glass from the head and the dial will be turned, placing the scale thereon in the lower part of the chamber at the outer side of the head.

I believe that I am the first to make a gage in which a rock-shaft having a float-carrying arm and a magnet is sustained in a bearing arranged at the inner side of an impervious head, said bearing occupying a position in a chamber at the inner side of said head, so that said float-carrying arm and magnet may move in unison in vertical circles, the bearing being connected with or forming part of the inner side of the head, the float-carrying arm moving vertically close to the wall of the tank to which the gage is applied, the magnet moving in the space between the arm and the inner side of the head.

The magnet is free to be revolved in the fluid in the tank, but said fluid as well as fumes rising therefrom is prevented from entering the chamber at the outer end of the head, which chamber receives the pin on which is loosely mounted the magnetic needle which is revolved over the dial in the chamber at the outer end of said head by the magnet as the position of the magnet is changed due to change of level of gasolene in the tank.

Having fully described my invention, what I claim as new and desire to secure by Letters Patent is:—

1. The combination with a vertical wall of a tank and a bushing therein, of a gage-head mounted in said bushing and chambered at its opposite ends, a pivot mounted in one of said chambers, a magnetic needle mounted on said pivot, a bearing sustained in the other chamber, a rock shaft mounted in said bearing, a magnet applied to the inner end of said shaft to be moved between said bearing and the dividing wall of said head, and a float fixed to the opposite end of said rock-shaft, the rock-shaft and its magnet being turned as the float is raised by the fluid in said tank.

2. In a fluid gage, the combination with a bushing to be fitted to the upright wall of a tank, of a gage-head chambered at its outer end and threaded exteriorly at its inner end to enter said bushing, a pivot in the chamber at the outer end of said gage, a magnetic pointer mounted on said pivot, a bearing connected with the inner end of said head, a rock-shaft sustained in said bearing, a permanent magnet carried by said rock-shaft and adapted to be rotated between said bearing and the division wall of said head, and a float fixed to the outer end of said rock-shaft.

In testimony whereof, I have signed my name to this specification, in the presence of two subscribing witnesses.

MORRIS MARTIN.

Witnesses:
GEO. W. GREGORY,
EVANGELINE C. BROWN.